(12) United States Patent
Morales

(10) Patent No.: US 7,926,634 B1
(45) Date of Patent: Apr. 19, 2011

(54) THIRD RAIL POWER INSULATING SYSTEM

(76) Inventor: Miguel Angel Morales, Miami, FL (US)

( * ) Notice: Subject to any disclaimer, the term of this patent is extended or adjusted under 35 U.S.C. 154(b) by 345 days.

(21) Appl. No.: 12/203,360

(22) Filed: Sep. 3, 2008

(51) Int. Cl.
*B60M 1/00* (2006.01)

(52) U.S. Cl. .............. 191/29 R; 191/30; 191/32

(58) Field of Classification Search ........... 191/29 R, 191/30, 31, 32, 22 R, 23 R, 25, 26, 29 DM; 238/109, 110, 119, 287
See application file for complete search history.

(56) References Cited

U.S. PATENT DOCUMENTS

| | | | |
|---|---|---|---|
| 762,769 A * | 6/1904 | Steinberger | 191/32 |
| 3,566,048 A * | 2/1971 | Martin | 191/22 R |
| 3,826,881 A * | 7/1974 | Spiringer | 191/32 |
| 4,318,462 A * | 3/1982 | Weinhaus | 191/30 |

* cited by examiner

*Primary Examiner* — Mark T Le
(74) *Attorney, Agent, or Firm* — Albert Bordas, P.A.

(57) ABSTRACT

A third rail power insulating system, comprising an insulator assembly and a cover board assembly. The insulator assembly comprises pedestal supporting insulators that are mounted onto a contact rail assembly. The insulator assembly further comprises an insulator anchor bolt assembly, a base shim plate, a bolt assembly, a lubricating shim, and retaining clips. The cover board assembly is also mounted onto the contact rail assembly and it comprises a support bracket assembly, retaining clips, a side cover board, and a top cover board. The support bracket assembly has a general C-shape and comprises a lateral wall, a top wall, a base wall, and a protrusion. The side cover board comprises an elongated plate having at least one hole, and the top cover board comprises an elongated plate having sufficient curvature to contour the support bracket assembly.

14 Claims, 5 Drawing Sheets

THIRD RAIL POWER INSULATING SYSTEM

BACKGROUND OF THE INVENTION

1. Field of the Invention

The present invention relates to insulating systems, and more particularly, to third rail power insulating systems.

2. Description of the Related Art

Elevated rapid transit systems comprise a contact rail system that is typically installed on an at-grade track and on aerial guideway supporting trackwork. The height of the contact rail system on the aerial guideway is typically 40' above surrounding ground, and at some locations can range up to 75' above the surrounding ground.

SUMMARY OF THE INVENTION

The instant invention is a third rail power insulating system. In the preferred embodiment, a design of a contact rail system is based approximately on a nominal 10' spacing of pedestal supporting insulators, with exceptions for the insulator spacing in dip sections or end approach sections. At those locations, a supplier provides spacing, which is compatible with these specification requirements and with the configuration of special trackwork.

As an example the present invention can be implemented onto the Miami-Dade County, Fla. elevated rapid transit system. Such a system is subject to extreme ultraviolet light exposures, thermal variations, and extreme wind load conditions. However, the present invention is suitable for operation in those types of specified environmental conditions. The present invention is completely operable with vehicle mounted current collector speeds of 0 to 80 miles per hour, and in an environment containing contaminants normally found in electrified railway operations, including oils, metallic dust from wheels, rails and brake shoes, and dirt and mud from wheel splash. The contact rail is typically subjected to localized thermal variations from 25° F. to 190° F.

More specifically, the instant invention is a third rail power insulating system, comprising an insulator assembly having supporting insulators. Each of the supporting insulators comprises a sidewall, a base, base holes, a first channel, channel holes, a top wall, distal ends, and a second channel. The insulator assembly is mounted onto a single molded pedestal that is part of a track guideway. The insulator assembly supports a contact rail, which supplies power to a transit vehicle.

A cover board assembly comprises a support bracket assembly, cover board assembly retaining clips, a side cover board, and a top cover board. The side cover board and the top cover board are mounted onto the support bracket assembly with nuts, bolts, and flat washers. The cover board assembly is also mounted onto the contact rail assembly. The support bracket assembly has a general C-shape and comprises a lateral wall, a top wall, a base wall, a protrusion, and at least one cutout defining a channel to allow a first water runoff and prevent a first water stream from making contact onto the contact rail assembly.

The top cover board comprises an elongated plate having sufficient curvature to contour the support bracket assembly. The top cover board also comprises an elongated lip at a predetermined angle from and at a first predetermined distance outwardly from the side cover board defining another water runoff to prevent another water stream from making contact onto the contact rail assembly. The insulator assembly further comprises an insulator anchor bolt assembly, a base shim plate, a bolt assembly, a lubricating shim, and supporting insulator retaining clips.

The insulator anchor bolt assembly supports and restrains the contact rail assembly and insulates it from ground and structure. The lubricating shim is of a different color than the supporting insulator. The supporting insulator retaining clips comprise a member, a through hole, and an arm. The through hole receives a bolt in an approximately horizontal fashion to secure the supporting insulators onto the contact rail assembly. The insulator anchor bolt assembly comprises a head, a neck, a shank, and internal threading. The lubricating shim is a copolymer shim located on top of each supporting insulators. The lubricating shim comprises a top wall and lateral tabs. The top wall defines a contact rail seat. The contact rail seat defines another water runoff to prevent another water stream from making contact onto the contact rail assembly. The cover board assembly retaining clips comprise a wall, an arm, a through hole, a channel, an edge, and a bolt, and the side cover board comprises an elongated plate having at least one hole. The supporting insulators, the support bracket assembly, the side cover board, and the top cover board are made of polycarbonate/ABS thermo plastic compound.

It is therefore one of the main objects of the present invention to provide a third rail insulating system.

It is another object of this invention to provide such a system that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Figure 1:
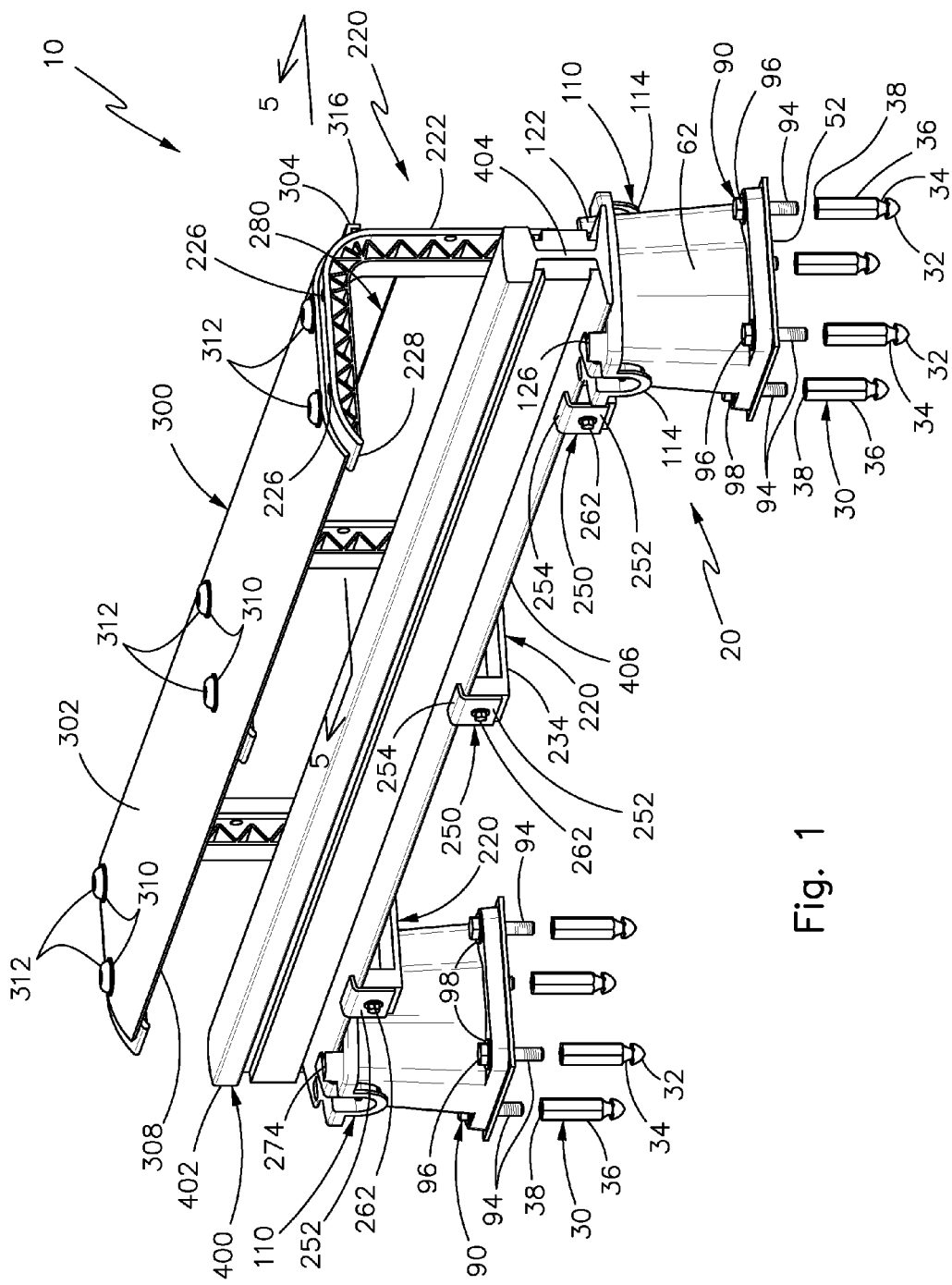
FIG. 1 represents a first isometric sectional view of the present invention mounted onto a contact rail assembly.

Referring now to the drawings, the present invention is generally referred to with numeral 10. It can be observed that it basically includes insulator assembly 20, and cover board assembly 200.

Figure 2:
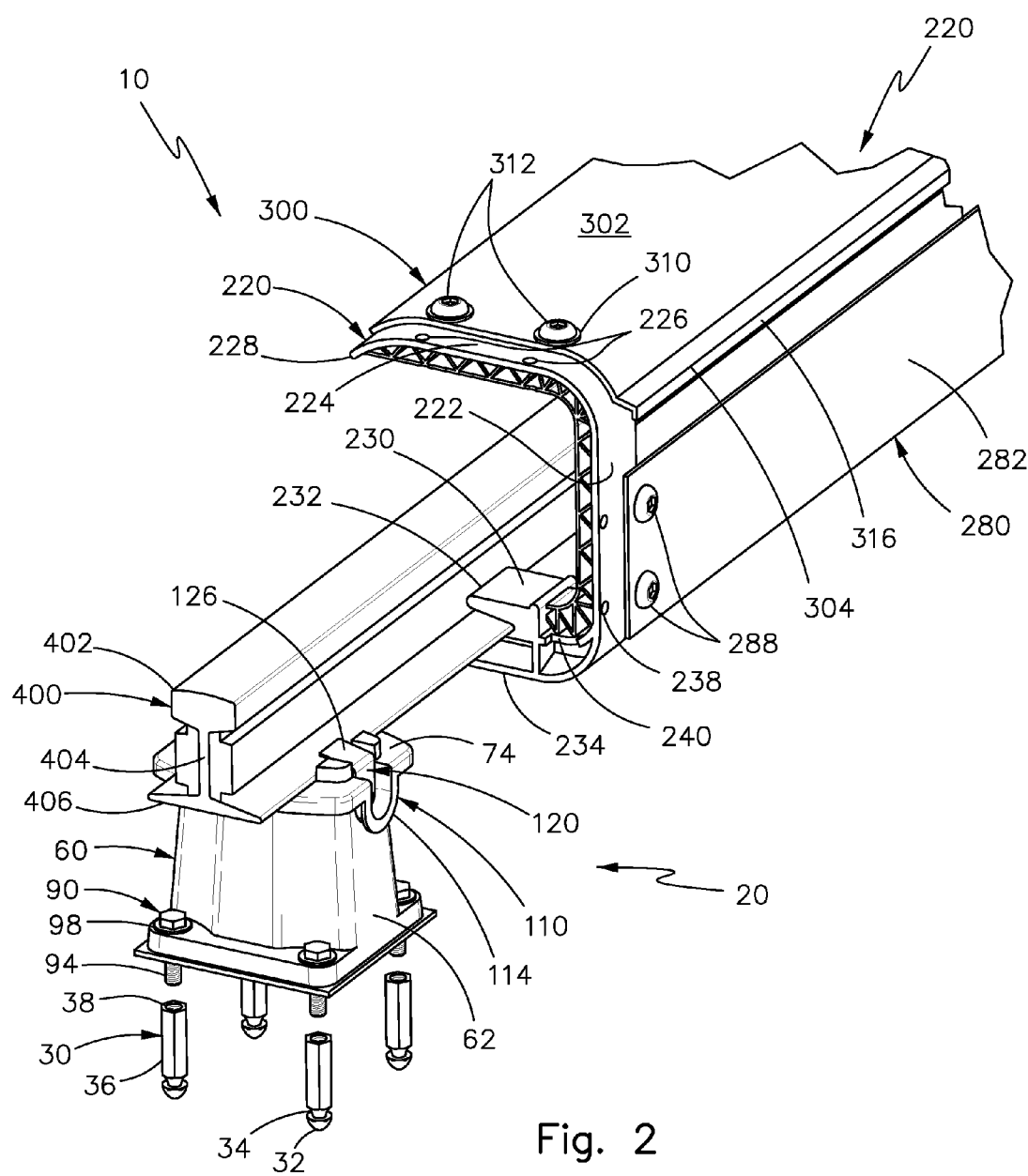
FIG. 2 represents a second isometric sectional view of the present invention mounted onto the contact rail assembly, whereby a side cover board and a top cover board have been removed to better illustrate the insulator assembly mounted onto the contact rail assembly.

As seen in FIGS. 1 and 2, insulator assembly 20 and cover board assembly 200 are mounted onto contact rail assembly 400. Contact rail assembly 400 comprises head 402 extending from neck 404 and having base 406.

Although not illustrated, contact rail assembly 400 is part of a contact rail system, which supplies positive power source to transit vehicles. The contact rail system is an arrangement of components consisting of contact rail, splice bars and pin bolts, anchor assemblies, expansion joints, end approaches, dip rail sections, and fastening hardware. Contact rail assembly 400 is a trackside conductor consisting of steel rail with aluminum bars attached on webs that are used to transmit electrical energy from a power source to a transit vehicle via current-collector shoes. Current collector shoes are part of a current collector attached to a vehicle, which rides along the top of the contact rail. Head 402 comprises a dip rail section, not seen, defining a portion of the contact rail at an elevation below the standard elevation, which allows the current-collector shoe in its lowest position to pass over it without physical contact.

Contact rail assembly 400 also comprises an end approach section, not seen, which is a section of contact rail used at the ends to ramp the collector shoe from one elevation in full contact, to another elevation out of contact, with the contact rail, or vice versa. Furthermore, contact rail assembly 400 also comprises expansion joints, not seen, which are an assembly used in the contact rail to accommodate thermal expansion and contractions.

Figure 3:
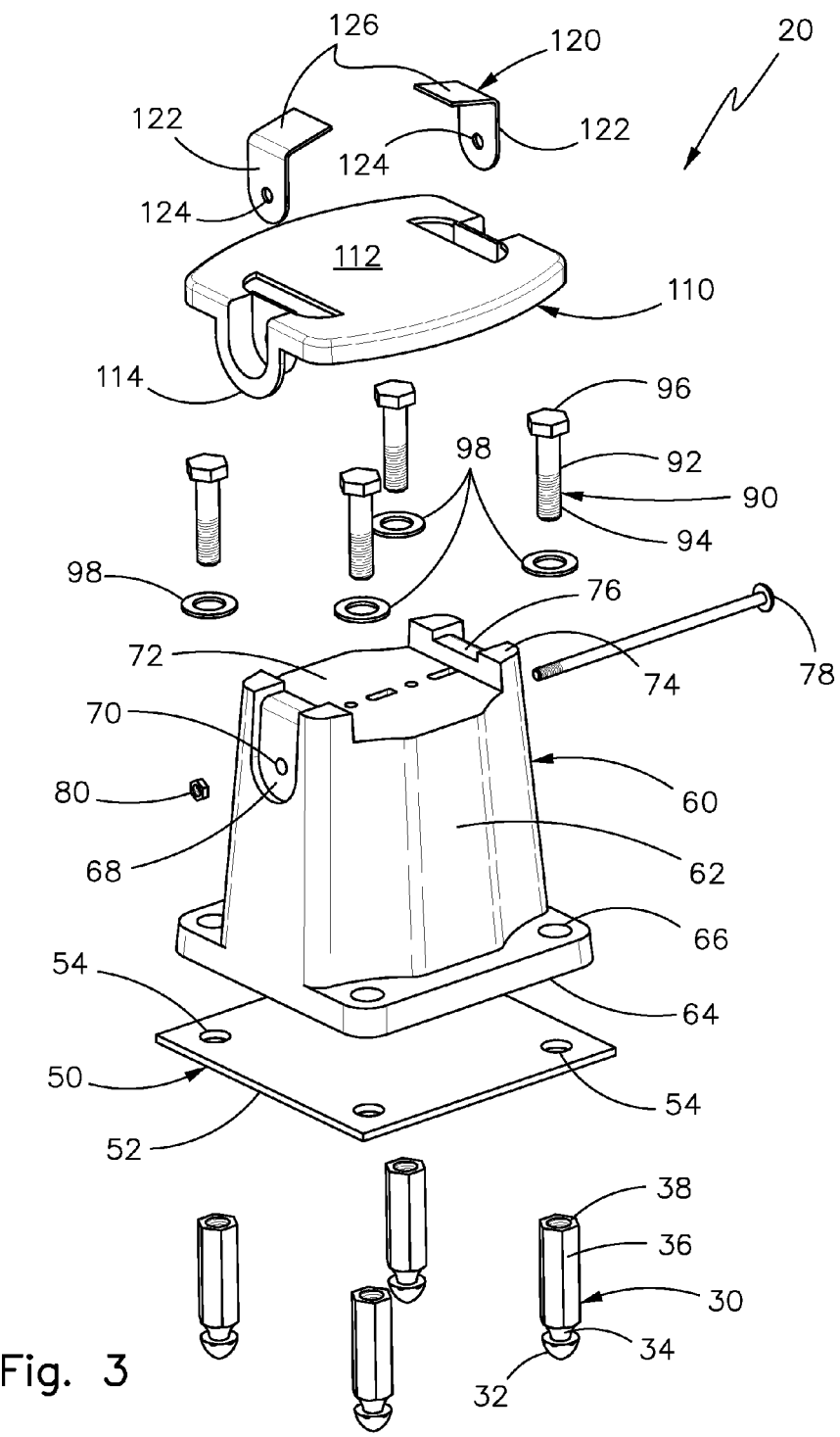
FIG. 3 is an exploded view of the insulator assembly.

As best seen in FIG. 3, insulator assembly 20 comprises insulator anchor bolt assembly 30, base shim plate 50, supporting insulator 60, bolt assembly 90, lubricating shim 110, and retaining clips 120. Insulator assembly 20 mounts upon a single molded pedestal, not seen.

Insulator anchor bolt assembly 30 supports and restrains the contact rail assembly 400, and insulates it from ground and structure. Insulator anchor bolt assembly 30 also ties supporting insulator 60 to a concrete support pedestal. Insulator anchor bolt assembly 30 comprises head 32, neck 34, shank 36, and internal threading 38. Insulator anchor bolt assembly 30 is manufactured from materials meeting the following requirements:

A) Anchor Bolts: ¾" diameter minimum, steel structural bolts meeting the requirements of ASTM A 325, Heavy Hex, Class 2B Thread;

B) Embedded Inserts to receive Anchor Bolts: Steel meeting the requirements of ASTM A 325, Class 2B thread. That part of the embedded insert is directly in contact with concrete and shall be given a 10 mil thick coating of dry powder epoxy resin, such as "3M SCOTHKOTE 413", Nap-Grad 7-2719, or similar; and C) Washers: Steel meeting the requirements of ASTM F436 and ASTM 325.

Base shim plate 50 has edges 52 and holes 54. Base plate 50 serves as a shim to level supporting insulators 60 if required.

Supporting insulator 60 comprises sidewall 62, base 64, holes 66, channel 68, holes 70, top wall 72, distal ends 74, channel 76, bolt 78, and nut 80. A contact rail seat is an area defined at top wall 112 of lubricating shim 110. The contact rail seat defines a drip edge to allow water runoff and prevent a water stream from making contact onto said contact rail assembly 400. It is noted that lubricating shim 110 is of a different color than supporting insulator 60 so that one may visually identify when lubricating shim 110 needs replacement due to damage or excessive wear. It provides vertical support to lubricating shim 110 and base 406 of contact rail assembly 400. The contact rail seat further provides lateral restraint against transverse movement Linder operating conditions. In addition, a horizontal projection around the contact rail seat defines a drip edge that is intended to break current flow from wet surfaces in contact with an energized contact rail assembly 400 and base 64 of supporting insulator 60. Insulator assemblies 20 are manufactured from materials meeting the following requirements:

D) Arc resistance: Minimum of 105 seconds, ASTM D 495;

E) Dielectric strength: Short time, minimum 200 Volts per mil, ASTM D 149;

F) Tracking resistance: Minimum 600 minutes at 2,500 volts, 60 hertz, ASTM D 2303;

G) Water absorption: 24 hours at 23° C. maximum weight increase 0.3%, ASTM D 570;

H) Flammability: Class 94V-0, UL 94 for maximum thickness of material, or 2 mm thickness, whichever is less;

I) Flame Spread Index: maximum of 25, ASTM E84;

J) Heat distortion: Minimum of 188° C. at 264 psi, ASTM D 648;

K) Impact, Izod type: Minimum of 4 foot-pounds per inch, Method A, ASTM D 256;

L) Outdoor suitability: Tensile, flexural, and Izod Impact properties shall not be less than 10% of the unconditioned value after exposure to Xenon Arc exposure in accordance with ASTM G 151 and GI 55 for a period of 1000 hours, whereas flammability properties shall not be reduced as a result of the UV Conditioning;

M) Color: Pantone PMS 420;

N) Flexural strength: Minimum of 25,000 psi, ASTM D 790;

O) Tensile strength: Minimum of 12,000 psi, ASTM D 638; and

P) Compressive strength: Minimum of 20,000 psi, ASTM D 695.

In the preferred embodiment, bolt assembly 90 comprises four bolts, each having shank 92, threads 94, head 96, and locking washers 98. Bolt assembly 90 is made of structural steel meeting the requirements of ASTM A325 Alloy Group 2.

Lubricating shim 110 is a copolymer shim located on top of supporting insulator 60 to provide reduced friction resistance of longitudinal contact rail movement due to thermal expansion and contraction. Lubricating shim 110 comprises top wall 112 and lateral tabs 114. In the preferred embodiment, lubricating shim 110 is manufactured from materials meeting the following requirements:

Q) Tensile strength: Minimum of 8,000 psi at 70'C, ASTM D 638;

R) Ultimate elongation: Minimum of 10%, ASTM D 638;

S) Compressive strength at 1% deflection: Minimum of 3,500 psi, ASTM D 695;

T) Water absorption: Maximum weight increase 0.5% after 24 hours, ASTM D 570;

U) Deflection temperature: Minimum of 110' at 264 psi, ASTM D 648;

V) Arc resistance: Minimum of 105 seconds, ASTM D 495; and

W) Static coefficient of friction against polished metal: 0.20, maximum.

Retaining clips 120 restrain uplift of the contact rail under design requirements for extreme wind load and short circuit conditions. Each retaining clip 120 comprises member 122, hole 124, and arm 126. In the preferred embodiment, retaining clips 120 are made of stainless steel and meet requirements of ASTM A276, Alloy Type 316.

Figure 4:
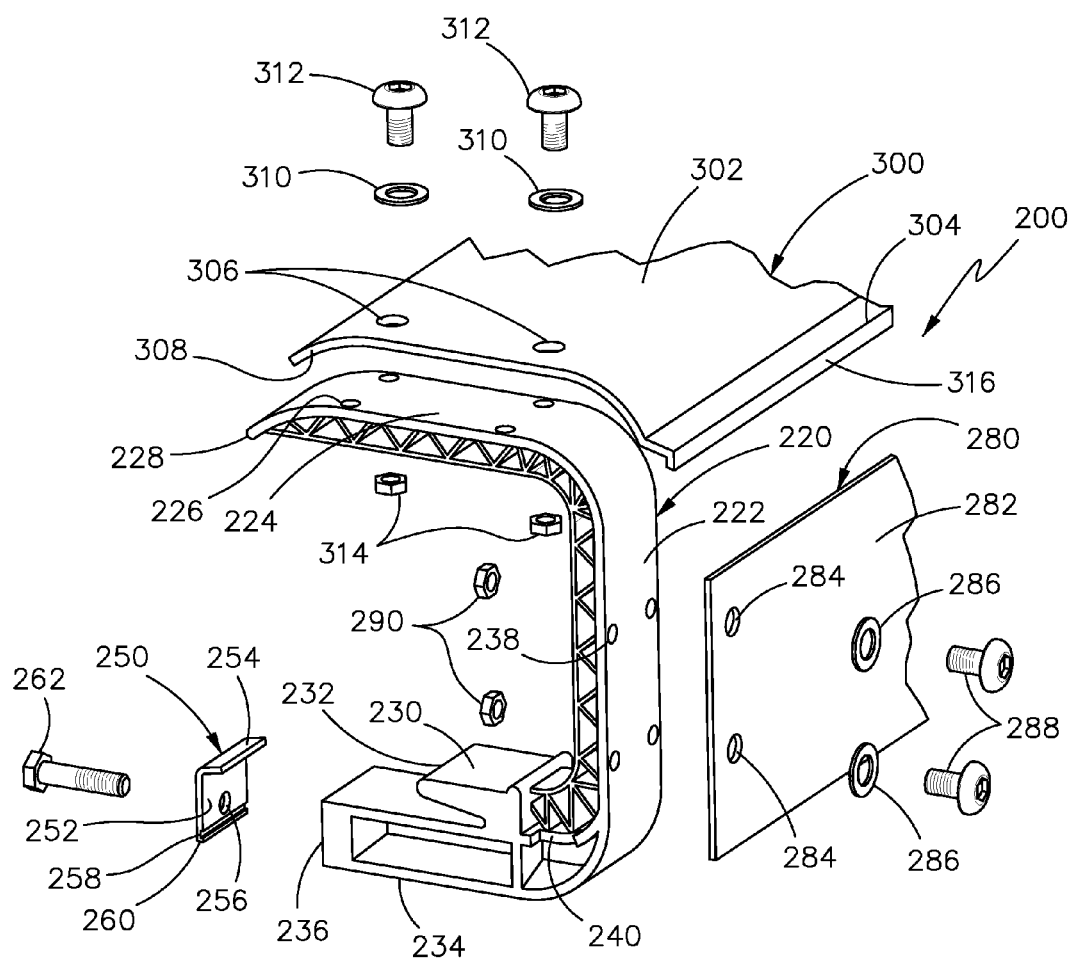
FIG. 4 is an exploded view of the support bracket assembly, the side cover board, and the top cover board.

As best seen in FIG. 4, cover board assembly 200 comprises an arrangement of assembled products including cover board, support brackets and fasteners, which when installed, mitigates the potential of an accidental contact with the contact rail. Cover board assembly 200 comprises support bracket assembly 220, retaining clip 250, side cover board 280, and top cover board 300. Support bracket assembly 220 comprises lateral wall 222, top wall 224, hole 226, distal end 228, protrusion 230, distal end 232, base wall 234, distal end 236, hole 238, and cutout 240. It is noted that cutout 240 defines a channel to allow water runoff and prevent a water stream from making contact onto contact rail assembly 400.

Retaining clip 250 comprises wall 252, arm 254, hole 256, channel 258, edge 260, and bolt 262. Side cover board 280 comprises plate 282, hole 284, washers 286, bolts 288, and nuts 290. Top cover board 300 comprises plate 302, edge 304, lip 316 hole 306, edge 308, washers 310, bolts 312, and nuts 314. It is noted that lip 316 is at a predetermined angle and at a first predetermined distance outwardly from side cover board 280 to allow water runoff and prevent a water stream from making contact onto contact rail assembly 400. In the preferred embodiment, cover board assembly 200 is manufactured from materials meeting the following requirements:

X) Arc resistance: Minimum of 105 seconds, ASTM D 495;

Y) Dielectric strength: Short time, minimum 200 Volts per mil, ASTM D 149;

Z) Insulation resistance test: The insulation resistance between any point in contact with contact rail assembly 400 and any other point of cover board assembly 200 shall be 10,000,000 ohms minimum when measured with a 1,000-volt megohmeter;

AA) Tracking resistance: Minimum 500 minutes at 2,500 volts, 60 hertz, ASTM D 2303;

AB) Water absorption: 24 hours at 23'C, maximum weight increase 0.3%, ASTM D 570;

AC) Flammability: Class 94V-0, UL 94 for maximum thickness of material, or 2 mm thickness, whichever is less;

AD) Flame Spread Index: maximum of 25, ASTM E84;

AE) Heat distortion: Minimum of 125'C at 264 psi, ASTM D 648;

AF) Impact, lzod type: Minimum of 4 foot-pounds per inch, Method A, ASTM D 256;

AG) Outdoor Suitability: Tensile, flexural, and lzod Impact properties shall not be less than 10% of the unconditioned value after exposure to Xenon Arc exposure in accordance with ASTM G 151 and G 155 for a period of 1000 hours. Flammability properties shall not be reduced as a result of the UV Conditioning;

AH) Color: Pantone PMS 420;

AI) Flexural strength: Minimum of 12,000 psi, ASTM D 790;

AJ) Tensile strength: Minimum of 8,000 psi, ASTM D 638; and

AK) Compressive strength: Minimum of 12,000 psi, ASTM D 695.

As an example, present invention 10 can be implemented onto the Miami-Dade County, Fla. elevated rapid transit system. Such a system is subject to extreme ultraviolet light exposures, thermal variations, and extreme wind load conditions. However, present invention 10 is suitable for operation in those types of specified environmental conditions. Present invention 10 is completely operable with vehicle mounted current collector speeds of 0 to 80 miles per hour, and in an environment containing contaminants normally found in electrified railway operations, including oils, metallic dust from wheels, rails and brake shoes, and dirt and mud from wheel splash. The contact rail is typically subjected to localized thermal variations from 25° F. to 190° F.

Figure 5:
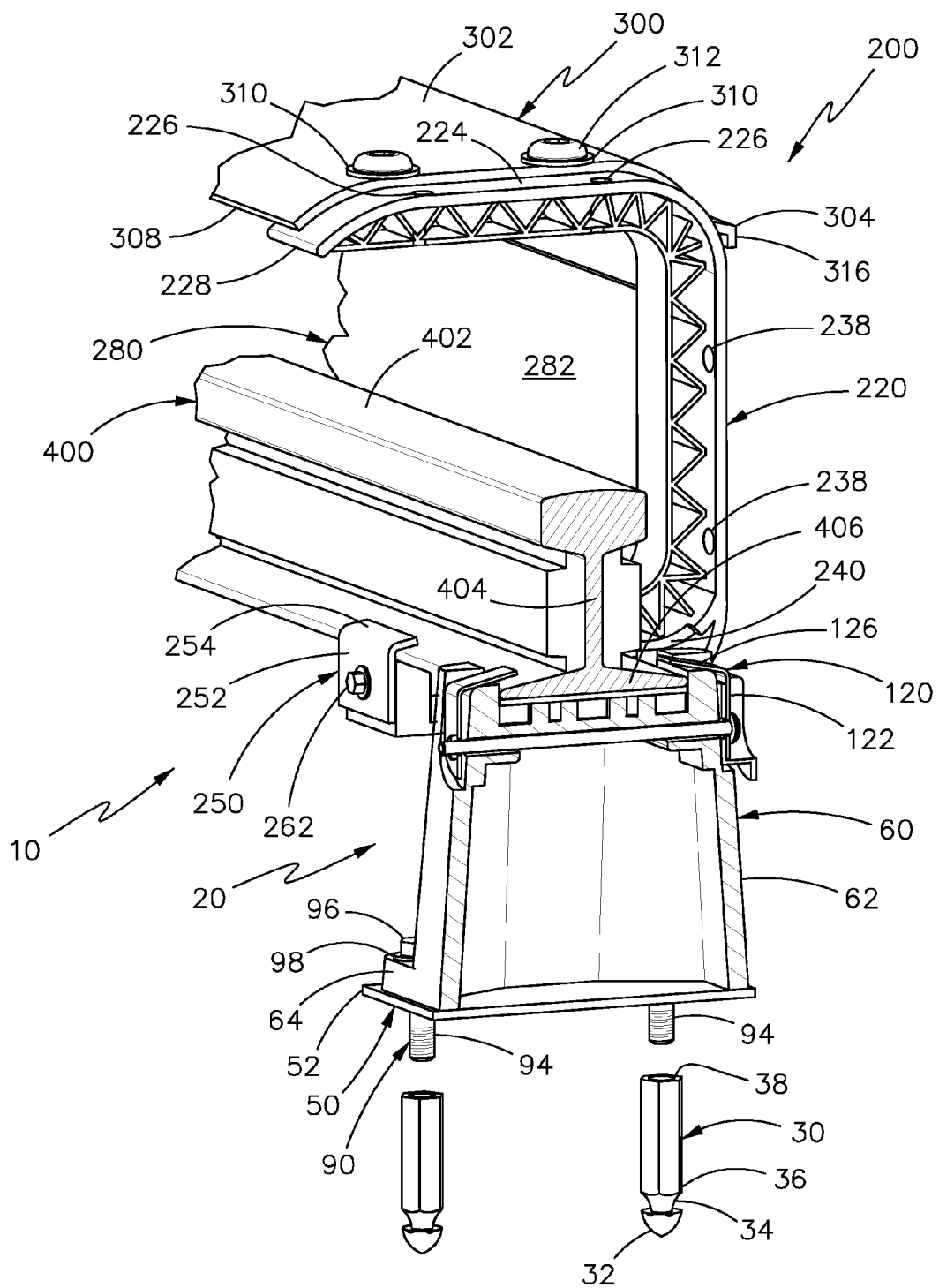
FIG. 5 is a cross-section view taken along lines 5-5 from FIG. 1.

As seen in FIG. 5, for installation of instant invention 10:

AL) Provide supporting insulators 60. It is noted that supporting insulators 60 are molded one piece, to provide structural capacity against uplift and lateral forces. Supporting insulators 60 are rated for a service having a nominal voltage of 750 volts direct current and a maximum regenerative potential of 900 volts, with a minimum leakage distance of 4" of the external surface of supporting insulators 60 from any energized metal component to ground.

AM) Provide copolymer lubricating shims 110 to fit top walls 72, seen in FIG. 3, defining an insulated contact rail seat. In the preferred embodiment, lubricating shims 110 are ⅛". The copolymer compound shall contain solid lubricants throughout the compound matrix, including top walls 72. Lubricating shims 110 will have suitable arrangement to secure it to the contact rail seat, and the vertical edge between lubricating shims 110 and supporting insulators 60 shall be seated with silicone.

AN) Carriage Bolts. Bolt 78 is a carriage bolt comprising a square neck.

AO) Provide insulator anchor bolt assembly 30 having internal threading 38 for bolt assembly 90. The embedded length of shank 92 shall have a minimum length of 4" and a maximum length of 5", with threads 94 having a minimum threaded engagement length of 2". Installed bolt assembly 90 shall engage internal threading 38 a minimum of 1¼".

AP) Provide an installed plug of metal or plastic material to preclude the entrapment of moisture concrete or other foreign materials in internal threading 38, capable of being removed with a flat screwdriver or other common tool. Plugs shall be capable of being reinserted multiple times without impairing function, or damaging internal threading 38 coatings.

AQ) Provide cover board assemblies 200. They shall be manufactured of a nonconductive, fire resisting material such as polycarbonate/ABS thermo plastic compound. All of cover board assembly 200 shall be of the same material. The material shall not separate, warp, buckle or sag under any environmental and operating conditions. Cover board assembly 200 shall resist sagging under their own weight, and shall not rattle when subjected to air turbulence due to wind conditions and passing vehicles. Cover board assembly 200 shall allow ready removal and replacement without disassembly of support bracket assemblies 220. All fasteners required to hold cover board assembly 200 in place shall be reusable and easily removable. Cover board assembly 200 shall be capable of being installed and maintained with standard hand tools, such as an Allen wrench. Cover board assembly 200 shall be detailed to provide a direct flow of water separation between each top cover board 300 and each support bracket assembly 220 connection to contact rail assembly 400.

AR) Provide support bracket assemblies 220. They shall be manufactured of a non-conductive, fire resisting material meeting the material property requirements of each insulator assembly 20. All support bracket assemblies 220 shall be of the same material. Support bracket assemblies 220 shall be clamped directly onto contact rail assembly 400. Support bracket assemblies 220 shall not encroach into a clearance envelope. Two types of support bracket assemblies 220 shall be furnished; standard fixed-height brackets and vertically adjustable brackets for implementation at dip rail sections. The vertically adjustable brackets shall have a range of height adjustment of approximately 2" in increments of ½". A cover board assembly 200 at dip rail sections shall be maintained at the specified height above the top of contact rail assembly 400 by using the vertically adjustable support brackets. If bolts 262 are made of steel and if used to clamp support bracket assemblies 220 to contact rail assembly 400, they shall not be in direct contact with contact rail assembly 400;

AS) Provide bolts 312 with compatible nuts 314 to connect top cover board 300 to support bracket assemblies 220. Install bolts 312 snug tight with washers 310 that are of 60 durometer neoprene.

Surfaces of the above referenced component parts shall be sound, free from defects, smooth, free of gaps, burrs, sharp edges, wrinkles, waves, and blemishes, and shall have uniformly rounded corners with constant radii. In the preferred embodiment, instant invention 10 comprises the following geometry:

AT) Insulator assembly 20 height: Provide insulator assemblies 20 with a height from a bottom of base 64 to a bottom of base 406 of approximately 7" for insulator assembly 20 standard height contact rail assembly 400, and 5" for a dip rail section. The distance between top wall 112 and a bottom of base shim plate 50 of any insulator assembly 20 shall vary no more than 1/16" from the dimensions indicated.

AU) In the preferred embodiment, a plurality of insulator assemblies 20 are spaced apart approximately every 10', and a plurality of cover board assemblies 20 are spaced apart approximately every 5'. An exception being for spacing in between insulator assemblies 20 due to dip sections or end approach sections. At those locations, a supplier provides spacing, which is compatible with specification requirements and with configuration of special track work. With regard to cover board assemblies 20, a minimum 5' spacing is required at contact rail assembly 400 expansion joints, not seen;

AV) Cover board assembly 200 at contact rail assembly 400 expansion joint, not seen: The maximum movement to be accommodated by cover board assembly 200 at the contact rail assembly 400 expansion joint, not seen, shall be a minimum of 12½".

AW) Contact rail seat: provide a contact rail seat with a width between bolt assemblies 90 providing transverse restraint 1/8" larger than a nominal width of the base 406. The distance between bolt assemblies 90 providing transverse restraint of any insulator assembly 20 shall vary no more than 1/32" from the dimensions indicated. Provide a contact rail seat with a minimum length of 4" in the longitudinal direction of the contact rail assembly 400.

AX) Drip edge: provide a minimum drip edge of 1/4" around the circumference of insulator assembly 20. The outer edge of the drip edge shall be turned down a minimum of 1/4", to prevent liquid roll back.

AY) Current collector shoe clearance envelope, not seen: Provide components that maintain a predetermined minimum clearance envelope. For dip rail sections, adjust an upper horizontal current collector shoe clearance plane from 5" to 7" above head 402 of contact rail assembly 400;

AZ) Vehicle clearance envelope: Provide components that maintain a predetermined minimum clearance;

BA) Coverboard assembly 200 dimensions: coverboard assembly 200 mitigates the potential of an accidental contact with contact rail assembly 400. Install coverboard assembly 200 with predetermined minimum clearance;

BB) Coverboard assembly 200 lengths: standard length of coverboard assemblies 200 shall be approximately 10' for use when contact rail assembly 400 curve is 1000' or greater. Standard length of coverboard assembly 200 shall be approximately 5' for use when contact rail assembly 400 curve is less than 1000'.

BC) Top cover board 300: minimum width of approximately 11", maximum width of approximately 12", measured horizontally from a point 4" from a centerline of contact rail assembly 400 towards a running rail, to the vertical plane of the side cover board 280. Maximum height of 7½", measured from a top of head 402 to top of top cover board 300;

BD) Side cover board 280: minimum ¾" below a bottom surface of base 406 to 2" above head 402.

BE) Open space between top cover board 300 and side cover board 280: maximum 3¼".

BF) Overhang at end approaches: cover board assembly 200 will project 12" beyond a tip of the end approach, and will have an unsupported condition of at least 24".

In the preferred embodiment, instant invention 10 meets structural and electrical resistance requirements in accordance with the following criteria:

BG) Design components shall meet the strength and serviceability requirements of ASCE/SEI 7 in addition to supplemental criteria included herein;

BH) Wind load criteria: instant invention 10 shall be designed to meet the wind load requirements of ASCE/SEI 7;

BI) Basic Wind Speed (V): 150 mph, defined as the 3-second gust speed at 33 feet above ground in Exposure Category C;

BJ) Importance Factor (/): 1.00;

BK) Wind Directionality Factor (Kd): 1.00;

BL) Velocity Pressure Exposure Coefficient (Kz): from ASCE/SEI 7;

BM) Topographic factor (Kzt): 1 1.00;

BN) Pressure coefficient including gust factor (GC): developed through wind tunnel testing of full scale samples in accordance with ASCE/SEI 7-05, Minimum Design Loads for Buildings and Other Structures to determine transverse and vertical pressures to be used for design.

Acceptable service performance under wind loading shall be as follows:

BO) Under 60 mph operational wind, global deflection of any component of instant invention 10 shall not exceed ¼" and base 406 shall remain fully seated in the contact rail seat. All components shall be free of splitting, cracking or breaking, and shall immediately return to its original shape and position when the load is removed, except that cover board assembly 200 shall immediately return to within 1/8" of its original shape and position when the load is removed.

BP) Under 150 mph service hurricane wind, all components shall be free of splitting, cracking or breaking, and shall immediately return to its original shape and position when the load is removed, except that cover board assembly 200 shall immediately return to within 1/8" of its original shape and position when the load is removed.

BQ) Under 120% of the 150 mph service hurricane wind, instant invention 10 shall be free of splitting, cracking or breaking.

Insulator assembly 20 shall be designed to meet the following operational load criteria:

BR) Insulator assembly 20, with all components in place, shall be designed to withstand, without any damage or deformation, critical forces.

Cover board assembly 200 shall be designed, fabricated, and tested to provide protection from electrical hazard. If stepped on, midway between support bracket assemblies 220, by a person weighing 250 lbs. plus impact, cover board assembly 200 may deflect a maximum of 2", but shall not split, crack, or break, and shall return to its original shape and position when the weight is removed. Maximum deflection of cover board assembly 200 under its own weight shall be 1/8" between support bracket assemblies 220.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A third rail power insulating system, comprising:
   A) an insulator assembly comprising supporting insulators, each of said supporting insulators comprise a sidewall, a base, base holes, first channels, channel holes, a first top wall, distal ends, and a second channel, said insulator assembly mounted onto a single molded pedestal that is part of a track guideway, said insulator assembly supports a contact rail assembly, which supplies power to a transit vehicle, said insulator anchor bolt assembly further comprises an insulator anchor bolt assembly, a base shim plate, a bolt assembly, a lubricating shim, and supporting insulator retaining clips, said insulator anchor bolt assembly supports and restrains said contact rail assembly and insulates it from ground and structure, said lubricating shim comprises a second top wall and lateral tabs, said lateral tabs fit within their respective said first channels when said second top wall is positioned upon said second channel; and B) a cover board assembly comprising a support bracket assembly, cover board assembly retaining clips, a side cover board, and a top cover board, said side cover board and said top cover board mounted onto said support bracket assembly, said cover board assembly is also mounted onto said contact rail assembly, said top cover board comprises an elongated plate having sufficient curvature to contour said support bracket assembly, said top cover board also comprises an elongated lip at a first predetermined distance outwardly from said side cover board defining a first water runoff and preventing a first water stream from making contact onto the contact rail assembly, said support bracket assembly has a general C-shape and comprises a lateral wall, a third top wall, a base wall, a protrusion, and at least one cutout defining a channel to allow a second water runoff and prevent a second water stream from making contact onto said contact rail assembly.

2. The third rail power insulating system set forth in claim 1, further characterized in that each of said supporting insulators retaining clips comprises a member, a through hole, and an arm, each of said through hole receives a bolt therethrough in an approximately horizontal fashion to secure said supporting insulators retaining clips onto said lubricating shim and said lubricating shim onto said supporting insulators, and said supporting insulators onto said contact rail assembly.

3. The third rail power insulating system set forth in claim 1, further characterized in that said insulator anchor bolt assembly comprises a head, a neck, a shank, and internal threading.

4. The third rail power insulating system set forth in claim 1, further characterized in that said lubricating shim is a copolymer shim located on top of each said supporting insulators, said second top wall defining a contact rail seat, said contact rail seat defines a drip edge to allow water runoff and prevent a water stream from making contact onto said contact rail assembly.

5. The third rail power insulating system set forth in claim 1, further characterized in that said cover board assembly retaining clips comprise a wall, an arm, a through hole, a channel, an edge, and a bolt.

6. The third rail power insulating system set forth in claim 1, further characterized in that said side cover board comprises an elongated plate having at least one hole.

7. A third rail power insulating system, comprising:
A) an insulator assembly comprising supporting insulators, each of said supporting insulators comprise a sidewall, a base, base holes, first channels, channel holes, a first top wall, distal ends, and a second channel, said insulator assembly mounted onto a single molded pedestal that is part of a track guideway, said insulator assembly supports a contact rail assembly, which supplies power to a transit vehicle, said insulator assembly further comprises an insulator anchor bolt assembly, a base shim plate, a bolt assembly, a lubricating shim, and supporting insulator retaining clips, said insulator anchor bolt assembly supports and restrains said contact rail assembly and insulates it from ground and structure, said lubricating shim is of a different color than said supporting insulator, said lubricating shim comprises a second top wall and lateral tabs, said lateral tabs fit within their respective said first channels when said second top wall is positioned upon said second channel, said second top wall defining a contact rail seat, said contact rail seat defines a drip edge to allow water runoff and prevent a water stream from making contact onto said contact rail assembly; and B) a cover board assembly comprising a support bracket assembly, cover board assembly retaining clips, a side cover board, and a top cover board, said side cover board and said top cover board mounted onto said support bracket assembly, said cover board assembly is also mounted onto said contact rail assembly, said support bracket assembly has a general C-shape and comprises a lateral wall, a third top wall, a base wall, a protrusion, and at least one cutout defining a channel to allow a first water runoff and prevent a first water stream from making contact onto said contact rail assembly, said top cover board comprises an elongated plate having sufficient curvature to contour said support bracket assembly, said top cover board also comprises an elongated lip at a predetermined angle and at a first predetermined distance outwardly from said side cover board defining a second water runoff and preventing a second water stream from making contact onto said contact rail assembly.

8. The third rail power insulating system set forth in claim 7, further characterized in that each of said supporting insulators retaining clips comprises a member, a through hole, and an arm, said through hole receives a bolt in an approximately horizontal fashion to secure said supporting insulators retaining clips onto said lubricating shim and said lubricating shim onto said supporting insulators, and said supporting insulators onto said contact rail assembly.

9. The third rail power insulating system set forth in claim 8, further characterized in that said insulator anchor bolt assembly comprises a head, a neck, a shank, and internal threading.

10. The third rail power insulating system set forth in claim 9, further characterized in that said cover board assembly retaining clips comprise a wall, an arm, a through hole, a channel, an edge, and a bolt.

11. The third rail power insulating system set forth in claim 10, further characterized in that said side cover board comprises an elongated plate having at least one hole.

12. The third rail power insulating system set forth in claim 11, further characterized in that said insulator assembly is manufactured from materials meeting the following requirements:
C) Arc resistance: Minimum of 105 seconds, ASTM D 495;
D) Dielectric strength: Short time, minimum 200 Volts per mil, ASTM D 149;
E) Tracking resistance: Minimum 600 minutes at 2,500 volts, 60 hertz, ASTM D 2303;
F) Water absorption: 24 hours at 23° C. maximum weight increase 0.3%, ASTM D 570;
G) Flammability: Class 94V-0, UL 94 for maximum thickness of material, or 2 mm thickness, whichever is less; and
H) Flame Spread Index: maximum of 25, ASTM E84.

13. The third rail power insulating system set forth in claim 12, further characterized in that said insulator assembly is manufactured from materials meeting the following requirements:
- I) Heat distortion: Minimum of 188° C. at 264 psi, ASTM D 648;
- J) Impact, lzod type: Minimum of 4 foot-pounds per inch, Method A, ASTM D 256;
- K) Outdoor suitability: Tensile, flexural, and Izod Impact properties shall not be less than 10% of the unconditioned value after exposure to Xenon Arc exposure in accordance with ASTM G 151 and GI 55 for a period of 1000 hours, whereas flammability properties shall not be reduced as a result of the UV Conditioning;
- L) Flexural strength: Minimum of 25,000 psi, ASTM D 790;
- M) Tensile strength: Minimum of 12,000 psi, ASTM D 638; and
- N) Compressive strength: Minimum of 20,000 psi, ASTM D 695.

14. The third rail power insulating system set forth in claim 13, further characterized in that said supporting insulators, said support bracket assembly, said side cover board, and said top cover board are made of polycarbonate/ABS thermo plastic compound.

* * * * *